United States Patent [19]

Palsgard et al.

[11] Patent Number: 4,788,773
[45] Date of Patent: Dec. 6, 1988

[54] APPARATUS FOR MEASURING LATERAL INCLINATION OF A ROADWAY WITH ERROR COMPENSATION

[76] Inventors: Göte Pålsgård, Eklundavägen 34A, S-702 17 Örebro; Bo Pålsgård, Hisingsgatan 33B, S-417 03 Göteborg; Sven A. Ahlström, Gundbo 3360, S-822 00 Alfta, all of Sweden

[21] Appl. No.: 805,845

[22] Filed: Dec. 5, 1985

[51] Int. Cl.[4] .............................................. G01C 9/10
[52] U.S. Cl. ...................................... 33/333; 33/141.5
[58] Field of Search ....................... 33/333, 331, 141.5

[56] References Cited

U.S. PATENT DOCUMENTS 2,320,290  5/1943  McNatt ............................... 33/141.5
2,524,934 10/1950  Silverman ........................... 33/141.5

Primary Examiner—William D. Martin, Jr.
Attorney, Agent, or Firm—Natter & Natter

[57] ABSTRACT

An apparatus for measuring the lateral inclination of a supporting surface comprises a lateral inclination indicator (5) arranged on a vehicle (1). A second indicator (6) delivers information corresponding to the velocity of the vehicle. There are means (6, 7, 8) for delivering information corresponding to the velocity difference between the two laterally displaced wheels. A device (9) is adapted to, on basis of information from the second indicator (6) and said means (6, 7, 8) and information concerning the lateral displacement between the wheels, cause a correction, which corresponds to faults of information from the inclination indicator (5) resulting in consequence of laterally directed forces in curves, and by means of this correction and the information from the inclination indicator deliver an output signal corresponding to the real lateral inclination. (FIG. 1).

6 Claims, 2 Drawing Sheets

APPARATUS FOR MEASURING LATERAL INCLINATION OF A ROADWAY WITH ERROR COMPENSATION

FIELD OF THE INVENTION AND PRIOR ART

The invention relates to measuring of the inclination of a supporting surface. In the first place it concerns supporting surfaces in the form of roads or similar foundation surfaces.

It is very important for the traffic security that the inclination values fixed by the road constructor really are observed at the building of the road. The lateral inclination, i.e. camber and slope, is of special importance. At an incorrect camber the risk of water accumulations on the road surface and therethrough aqua planning appears. At incorrect slope the driver can be surprised in a curve and loose the control over his vehicle. According to the prior art control measuring of the road inclination is carried out in manual manner, wherein the measuring crew move along the road and carry out measurings at certain points. Such a procedure is very expensive as a consequence of the enormous time consumption.

BRIEF DESCRIPTION OF THE INVENTION

The object of the present invention is to provide an apparatus by means of which inclination measuring can be carried out rapidly and rationally by a vehicle drivable on the road or the supporting surface in question and under maintenance of a very good accuracy of measurement.

This object is obtained through an apparatus, the exact features of which appear from the appended claims.

Since the apparatus according to the invention is designed so as to compensate the inclination information in consequence of incorrect indications coming from the inertia forces influencing the inclination indicator in question during the changing of the driving direction of the vehicle, this can be moved fast along the supporting surface during the measurement. On roads it is possible to carry out the measuring during ordinary traffic conditions, since the vehicle can be driven with any speed desired during the measuring.

BRIEF DESCRIPTION OF THE DRAWINGS

With reference to the appended drawings below follows a specific description of an embodiment of the invention described as an example.

In the drawings.

DETAILED DESCRIPTION OF THE PREFERRED EMBODIMENT

Figure 1:
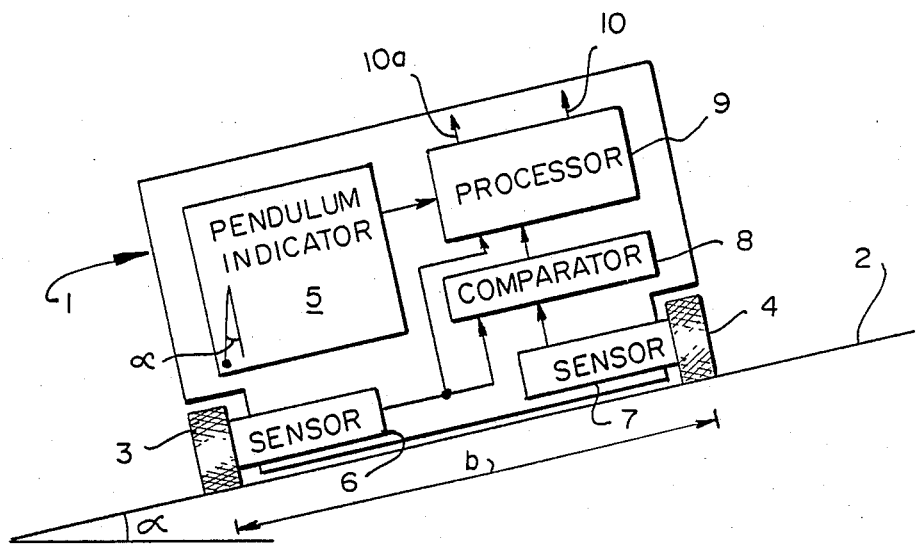
FIG. 1 is a schematic view illustrating the apparatus according to the invention.
Figure 1A:
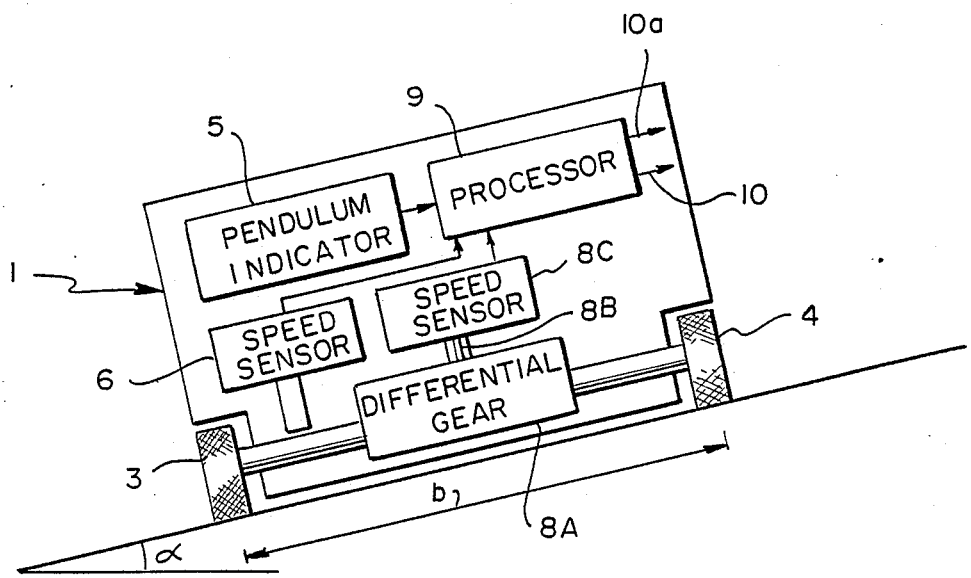
FIG. 1A is a schematic view illustrating a further embodiment of the invention wherein a differential gear rather than a comparator is employed to compute the difference between the speeds of two laterally spaced wheels of a vehicle.

In FIG. 1 a measuring vehicle 1 is illustrated during its movement on an inclined supporting surface 2, e.g. a road. The inclination angle is indicated by $\alpha$. The normal driving direction of the vehicle is perpendicular to the drawing plane. The vehicle has at least two wheels 3, 4 laterally displaced with respect to each other. On the vehicle an sensor 5 is adapted to delivering of information concerning the inclination angle $\alpha$ of the vehicle in the lateral direction of the vehicle. Thus in driving the vehicle in the longitudinal direction of a road the sensor 5 will deliver information concerning the inclination in a lateral direction of the road. The sensor 5 can consist of a pendulum indicator.

At least one wheel of the vehicle is associated with a second sensor 6 or 7 for delivering of information corresponding to the velocity of this wheel. The apparatus so far as described until now could be used for lateral inclination measuring if the sensor 5 and the sensor 6 or 7 is connected to a recording means for recording the relationship lateral inclination/driving distance. The recording means may be a writer, for which a paper feed would be synchronized with the sensor 6 or 7, so that the paper feed consequently would occur in dependence of driving distance. The inclination sensor 5 may be adapted to control the crayon of the writer. A problem of such an apparatus is however that the inclination sensor, during the movement through road curves in the horizontal plane, will make incorrect indications depending on the curve radius in question and the velocity. The present invention intends to correct such incorrect indications.

For this purpose a comparator 8 is adapted to deliver information corresponding to the velocity difference between the two with respect to each other laterally displaced wheels 3 and 4, besides which a processor 9 is adapted to, on basis of information from the sensor 6 or 7 and the comparator 8 and information concerning the lateral displacement b between the wheels 3 and 4, cause a correction, which corresponds to faults of information from the inclination indicator resulting in consequence of the laterally directed forces in curves, and by means of this correction and the information of the inclination indicator deliver an output signal corresponding to the real lateral inclination at an output 10.

Faults of information of the inclination indicator 5 at movement through curves are depending on the centripetal acceleration $a_c$:

$$a_c = \frac{V^2}{R}$$

where V is the velocity and R the curve radius.

Figure 2:
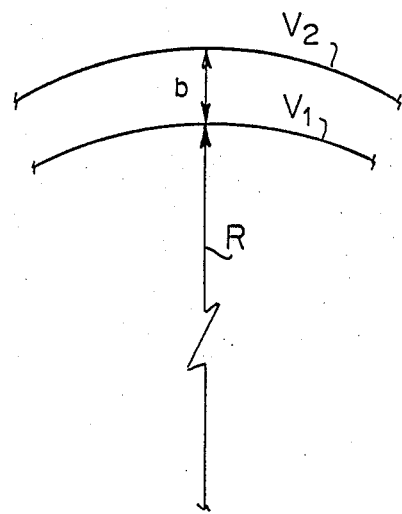
FIG. 2 is a view illustrating the measuring vehicle from above during its movement through a curve and FIG. 3 is a schematic view of the apparatus provided with means for indicating the longitudinal inclination of the vehicle.

From this equation it appears that V and R must be measured for obtaining said correction term. On basis of this one can through the following mathematical connection derive the correction which the present invention is utilizing:

$$\left. \begin{array}{l} V_1 = R\dot{\phi} \\ V_2 = (R + b)\dot{\phi} \end{array} \right\} \Delta V = b\dot{\phi}$$

$$a_c = \frac{V^2}{R} = R(\dot{\phi})^2 = R\dot{\phi} \cdot \dot{\phi} = V_1 \cdot \frac{\Delta V}{b}$$

where (compare with FIG. 2)

R = curve radius b = the lateral distance between the wheels $\dot{\phi}$ = angular velocity
$a_c$ = the centripetal acceleration
$V_1$ = the velocity of the curve-inner wheel
$V_2$ = the velocity of the curve-outer wheel.

In the formula $a_c = V_1 \cdot \Delta V / b V_1$ is (i.e. the velocity of the curve-inner wheel) chosen as measure of the velocity of the vehicle. $V_2$ could naturally instead enter into the formula or alternatively the average of $V_1$ and $V_2$.

According to a first embodiment of the invention $\Delta V$ (i.e. the difference between $V_1$ and $V_2$) is obtained by comparing the output signals from the sensors 6 and 7 associated with the wheels 3 and 4 by the comparator 8, which is constructed as a comparer, so that consequently from this an output signal is obtained, which corresponds to the velocity difference and is fed to the processor 9. The distance b is known and coded/codable in the comparator 9. The output signal from the sensor 6 is fed, in addition to the comparator 8, directly to the processor 9. As a result, the processor 9 receives information about the velocity of the measuring vehicle. Alternatively a separate further sensor may be associated with one of the wheels 3 and 4 or a further wheel of the vehicle in order to give information concerning its velocity. The apparatus according to the invention can naturally be constructed to operate as well in analogue manner as digital. In the analogue case the sensors 6 and 7 can be constructed to deliver output signals, the voltage of which varies in dependence of the velocity. In the digital embodiment the sensors may constitute pulse generators, the pulse frequency of which varies in dependence of the rate of rotation of the wheels.

On the output 10 of the processor 9 consequently a signal corresponding to the real lateral inclination of the road is obtained, i.e. a signal corresponding to the output signal of the inclination indicator 5 corrected in relation to the term $V_1 \cdot \Delta V / b$. On a second output 10a from the processor 9 a signal is obtained, which corresponds to the driving velocity of the measuring vehicle and thus can be sensed by one of the sensors 6 and 7 or a further indicator not shown.

The outputs 10 and 10a are connected to a recording means in a way already indicated above, so that consequently a documentation of the relationship lateral inclination/distance can be attained. Above that actual inclination and velocity values can naturally be indicated for the operator by traditional instruments.

As an alternative to dispose sensors 6 and 7 for the rate of rotation on both of the wheels 3 and 4 one may let the wheels drive a differential gear 8A, the output shaft 8B of which may get a rate of rotation proportional to the velocity difference between the wheels. This rate of rotation may then be detected by a suitable sensor 8C, and the information obtained supplied to the processor 9. Above that an sensor 6 for delivering of information concerning the absolute velocity of the measuring vehicle would naturally be required.

Figure 3:
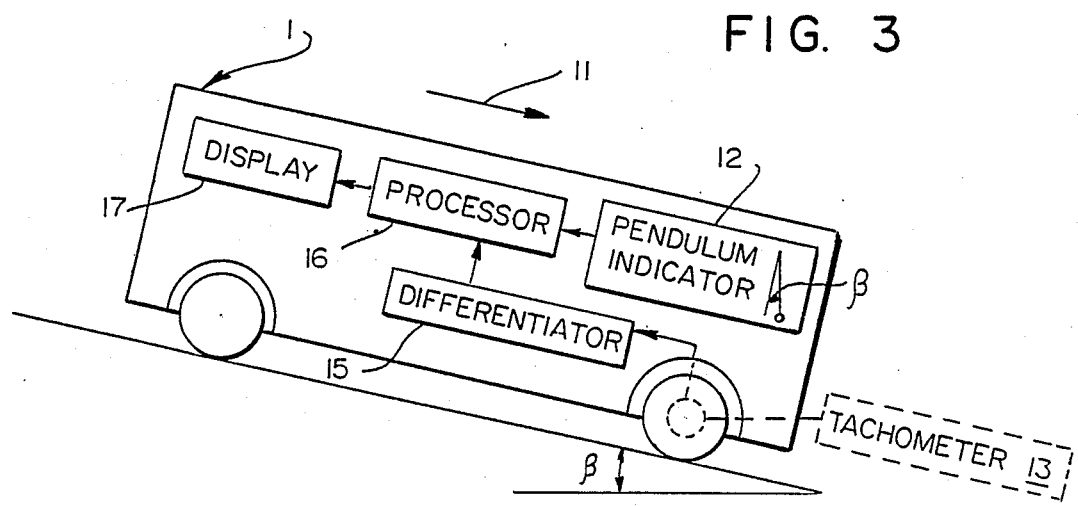

In the embodiment sketched in FIG. 3 the vehicle 1 is, in order to obtain information about the total profile of the road, also constructed for measuring of the longitudinal inclination of the road or the supporting surface in question. The normal movement direction of the vehicle is indicated by the arrow 11. On the vehicle an sensor 12 is adapted to deliver information concerning the inclination angle $\beta$ of the vehicle in its normal movement direction. The sensor 12 can be a pendulum indicator or an accelerometer. As in the situation already described there is an sensor 13 for delivering of information corresponding to the vehicle velocity. The sensor 13 consists of a tachometer associated with a wheel of the vehicle. A system 14 for providing a corrected longitudinal inclination signal includes a differentiating circuit 15 for transforming the information concerning the vehicle velocity from the sensor 13 to a correction information, which corresponds to the variation of the vehicle velocity, i.e. the acceleration and the retardation of the vehicle. The system 14 does also comprise a processor 16 in order to, on basis of the information obtained from the inclination sensor 12 and concerning the longitudinal inclination of the vehicle and the correction information obtained from the circuit 15, which corresponds to faults of information from the inclination indicator 12 occurring as a consequence of velocity variations of the vehicle, cause an output signal corresponding to the real longitudinal inclination, which signal can be indicated visually in a display 17. In practice the circuit 15 is designed to produce the differential quotient of the output signal from the analogue operating tachometer sensor 13, so that consequently the derived and possibly amplified or otherwise treated output signal forms a correction signal.

Thus in consequence of the embodiment according to FIG. 3 the vehicle 1 can be driven along the supporting surface in acceleration as well as retardation without obtaining incorrect values of the longitudinal inclination thereby. Also in the embodiment according to FIG. 3 an output signal from the processor 16 and a signal directly corresponding to the vehicle velocity can be conveyed to a recording means, for instance a writer, for recording of the relationship longitudinal inclination/driving distance. The signal concerning the vehicle velocity can then be obtained from the already mentioned sensor 13 or a further velocity indicator.

The operation of the sensor 13 can naturally, if so is desired, be taken over by one of the sensors 6 or 7, and thereby the first mentioned sensor can be saved.

We claim:

1. A system for measuring the lateral inclination of a supporting surface upon which a vehicle is traversing, the vehicle having at least two laterally spaced means for contacting and traversing the supporting surface, the system including means carried on the vehicle for sensing the lateral inclination of the supporting surface and for generating an uncorrected lateral inclination signal, means for generating a signal indicative of the vehicle speed at at least one of the two laterally spaced contacting means, means for generating a signal indicative of the difference between the vehicle speeds at the two laterally spaced contacting means, and processor means, the processor means receiving the uncorrected inclination signal, the difference signal, and the speed signal and in response thereto, generating a corrected real lateral inclination signal, the real inclination signal being indicative of the true angle of lateral inclination of the supporting surface.

2. A system for measuring a lateral inclination of the supporting surface constructed in accordance with claim 1 further including recording means, the recording means receiving the corrected real lateral inclination signal and the signal indicative of the vehicle speed and, in response thereto, recording the angle of lateral inclination of the supporting surface as a function of distance traversed by the vehicle.

3. A system for measuring the lateral inclination of a supporting surface constructed in accordance with claim 1, wherein the means for contacting and traversing the supporting surface comprises wheels, the means for generating the difference signal comprises a tachometer operationally connected with each wheel, each tachometer generating a signal indicative of the speed of its respective wheel, and comparative means, the comparative means receiving the tachometer signal and in response thereto generating the difference signal.

4. A system for measuring the lateral inclination of a supporting surface constructed in accordance with claim 3, wherein the means for generating the signal indicative of the vehicle speed comprises one of the tachometers.

5. A system for measuring the lateral inclination of a supporting surface constructed in accordance with claim 1, wherein the means for generating the difference signal comprises a differential gear including input means, the input means being connected to both means for contacting and for traversing the supporting surface, the differential gear having an output shaft and means for rotating the output shaft at a velocity indicative of the difference between the vehicle speeds at the two means for contacting and traversing the supporting surface and sensor means for generating a signal indicative of the speed of the output shaft, the signal indicative of the output shaft speed constituting the difference signal.

6. A system for measuring the inclination of a supporting surface upon which a vehicle is traversing at other than constant speed as constructed in accordance with claim 1, the system including means carried on the vehicle for sensing the longitudinal inclination of the supporting surface and for generating an uncorrected longitudinal inclination signal, means for generating a signal indicative of the variation of vehicle speed, and processing means, the processing means receiving the uncorrected longitudinal inclination signal and the signal indicative of the variation of vehicle speed and in response thereto, generating a corrected real longitudinal inclination signal indicative of the true longitudinal angle of inclination of the supporting surface.

* * * * *